United States Patent
Hwang et al.

(10) Patent No.: US 11,469,640 B2
(45) Date of Patent: Oct. 11, 2022

(54) ONE BODY TYPE TERMINAL ASSEMBLY OF DRIVING MOTOR FOR VEHICLE AND MANUFACTURING METHOD THEREOF

(71) Applicant: HYUNDAI MOBIS Co., Ltd., Seoul (KR)

(72) Inventors: Seong Jun Hwang, Yongin-si (KR); Jin Ho Jung, Yongin-si (KR); Hye Seong Yang, Gwangju (KR)

(73) Assignee: Hyundai Mobis Co., Ltd., Seoul (KR)

( * ) Notice: Subject to any disclaimer, the term of this patent is extended or adjusted under 35 U.S.C. 154(b) by 239 days.

(21) Appl. No.: 16/998,292

(22) Filed: Aug. 20, 2020

(65) Prior Publication Data

US 2021/0057957 A1 Feb. 25, 2021

(30) Foreign Application Priority Data

Aug. 23, 2019 (KR) ........................ 10-2019-0103903

(51) Int. Cl.
*H02K 3/52* (2006.01)
*H02K 15/00* (2006.01)

(52) U.S. Cl.
CPC ......... *H02K 3/522* (2013.01); *H02K 15/0062* (2013.01); *H02K 2203/09* (2013.01); *H02K 2203/12* (2013.01)

(58) Field of Classification Search
CPC . G10D 13/20; H02K 15/0062; H02K 2203/09
See application file for complete search history.

(56) References Cited

U.S. PATENT DOCUMENTS

| | | | |
|---|---|---|---|
| 9,318,814 B2* | 4/2016 | Tomita | H02K 3/50 |
| 9,871,422 B2* | 1/2018 | Kim | H02K 3/522 |
| 2016/0155432 A1* | 6/2016 | Krol | G10D 13/02 |
| | | | 248/206.5 |
| 2019/0157934 A1* | 5/2019 | Kawaguchi | H02K 3/522 |
| 2021/0057957 A1* | 2/2021 | Hwang | H02K 3/50 |
| 2021/0359570 A1* | 11/2021 | Seo | H02K 3/50 |
| 2022/0014065 A1* | 1/2022 | Seo | H02K 5/04 |
| 2022/0029493 A1* | 1/2022 | Seo | H02K 3/50 |
| 2022/0094233 A1* | 3/2022 | Seo | H02K 3/50 |
| 2022/0166286 A1* | 5/2022 | Yang | H02K 15/0062 |

* cited by examiner

*Primary Examiner* — Robert W Horn
(74) *Attorney, Agent, or Firm* — Morgan, Lewis & Bockius LLP

(57) ABSTRACT

Provided are a one body type terminal assembly of a driving motor for a vehicle and a manufacturing method thereof, the one body type terminal assembly including a bus bar assembly including a plurality of ring-shaped bus bars overlapping each other, each of which is primarily insert-injection-molded and of which an outer surface is surrounded with an insulating material; and flanges which are simultaneously insert-injection-molded with the bus bar assembly to be formed to protrude from an outer circumferential surface of the bus bar assembly at intervals when the bus bar assembly is secondarily insert-injection-molded.

20 Claims, 11 Drawing Sheets

A-A'

ONE BODY TYPE TERMINAL ASSEMBLY OF DRIVING MOTOR FOR VEHICLE AND MANUFACTURING METHOD THEREOF

CROSS-REFERENCE TO RELATED APPLICATION

This application claims priority to and the benefit of Korean Patent Application No. 10-2019-0103903, filed on Aug. 23, 2019, the disclosure of which is incorporated herein by reference in its entirety.

BACKGROUND

1. Field of the Invention

The present invention relates to a one body type terminal assembly of a driving motor for a vehicle and a manufacturing method thereof, which allow structural rigidity to be secured and a production cost to be reduced through overmolding of a bus bar assembly.

2. Discussion of Related Art

Generally, a terminal assembly structure is applied to a drive motor which employs a concentrated winding method. The terminal assembly refers to a group of bus bars for transmitting a current introduced into an inverter to each of distributed coil-bobbin assemblies (hereinafter referred to as "coil assemblies").

Here, the bus bar has a structure for transmitting a current, which is introduced by being separated into three phases, to each of the coil assemblies, and there are four types of U, V, W, and neural point (N) phases. In this case, in order to secure insulation performance, a periphery of the bus bar for each phase is surrounded through an insert injection method.

Generally, in a drive motor of a vehicle, a plurality of coils (coil assemblies) are connected in parallel so as to prevent a loss due to coil resistance.

Therefore, the drive motor of the vehicle employs a method in which the coils extend to an input/output terminal when connected in parallel and then are connected by being collected at the input/output terminal. The terminal assembly is coupled to an upper side of a stator to collect and connect the coils which are disposed in parallel as described above.

The terminal assembly is manufactured by assembling the bus bar for each phase surrounded by an injection material through a bushing. In this case, the bus bar surrounded by the injection material is press-inserted using the bushing and then assembled.

Here, the press-inserted portions may be strongly fixed. However, since a pressurizing force does not reach a space between the press-inserted portions, there is a problem in that a fixing force of a non-press-inserted portion (a terminal sub-assembly) becomes weak.

A position of the existing bus bar is set through an assembly ledge and a separate fixing groove corresponding thereto. However, since such a structure requires accuracy and precision, work efficiency is reduced.

In addition, a portion of which a fixing force becomes weak has a problem of inevitably easily being damaged when an impact such as a vibration is applied. Therefore, a structure is required to fix an entire circumference of the terminal assembly.

SUMMARY

The present invention is directed to reducing a production cost by overmolding to integrate a bus bar assembly sharable for each vehicle type with a flange having different specifications with respect to each vehicle type.

The problems to be solved by the present invention are not limited to those described above, and other problems not mentioned above should be clearly understood by those skilled in the art from the following description.

According to an aspect of the present invention, there is provided a one body type terminal assembly of a driving motor for a vehicle, the one body type terminal assembly including a bus bar assembly including a plurality of ring-shaped bus bars overlapping each other, each of which is primarily insert-injection-molded and of which an outer surface is surrounded with an insulating material; and flanges which are simultaneously insert-injection-molded with the bus bar assembly to be formed to protrude from an outer circumferential surface of the bus bar assembly at intervals when the bus bar assembly is secondarily insert-injection-molded.

Each of the bus bars may be formed by being primarily insert-injection-molded after a plurality of bus bar unit bodies forming an arc are mutually welded.

A plurality of coupling grooves may be provided on an upper end and a lower end of each of the bus bars in a circumferential direction.

The coupling groove may be located at a welding seam of the bus bar unit body.

When the bus bar is primarily injection molded, the welding seam may be pressurized by being in contact with a mold so as to not be affected by an injection pressure.

The bus bar may be provided with a coupling protrusion corresponding to the coupling groove.

Some adjacent sections of the bus bars are concavo-convex coupled so as to overlap each other without loose parts.

A plurality of hook portions connecting a coil assembly wound around a bobbin of a drive motor may be formed to protrude from inner portions of the bus bars.

In order to secure a predetermined thickness when the bus bars are secondarily insert-injection-molded, a plurality of support protrusions in contact with a mold may be formed on an upper end and a lower end of the bus bar assembly.

A thickness of an injection product made of an insulating material, which surrounds an outer surface of the bus bar assembly, may correspond to a length of the support protrusion.

A plurality of side protrusions may be formed to protrude from the outer circumferential surface of the bus bar assembly at positions corresponding to the support protrusions to be in contact with the mold.

The flange may be insert-injection-molded in a state in which the flange surrounds a side surface of a bushing which passes therethrough vertically.

A vertical length of the flange may be shorter than a vertical length of the bus bar assembly, and a vertical length of the bushing may be equal to that of the flange.

According to another aspect of the present invention, there is provided a method of manufacturing a one body type terminal assembly of a driving motor for a vehicle, the method including, a welding operation of welding a plurality of bus bar unit bodies forming an arc to form a ring-shaped bus bar, a primary insert-injection-molding operation of insert-injection-molding an outer surface of the bus bar with an insulating material, and a secondary insert-injection-molding operation of performing insert-injection-molding after setting the bus bar assembly, in which a plurality of the bus bars, which are primarily insert-injection-molded, to overlap each other, and a plurality of bushings to be seated on an outer circumferential surface of the bus bar assembly.

In the welding operation, the bus bar may be formed by welding four bus bar unit bodies which are equally divided.

In the primary insert-injection-molding operation, a plurality of coupling grooves may be formed in an upper end and a lower end of the bus bar in a circumferential direction so as to locate the bus bar at a welding seam of the bus bar unit body.

In the primary insert-injection-molding operation, the welding seam may be pressurized by being in contact with a mold so as to not be affected by an injection pressure.

In the secondary insert-injection-molding operation, the bus bar assembly may be overmolded, and a flange surrounding the bushing may be formed on the outer circumferential surface of the bus bar assembly.

In the secondary insert-injection-molding operation, in order to secure a predetermined thickness, a plurality of support protrusions in contact with a mold may be formed on an upper end and a lower end of the bus bar assembly, and a plurality of side protrusions may be formed to protrude from the outer circumferential surface of the bus bar assembly at positions corresponding to the support protrusions to be in contact with the mold.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods for achieving them will be made clear from embodiments described in detail below with reference to the accompanying drawings. However, the present invention may be embodied in many different forms and should not be construed as being limited to the embodiments set forth herein. Rather, these embodiments are provided so that this disclosure will be thorough and complete and will fully convey the scope of the present invention to those of ordinary skill in the technical field to which the present invention pertains. The present invention is defined by the claims. Meanwhile, terms used herein are for the purpose of describing the embodiments and are not intended to limit the present invention. As used herein, the singular forms include the plural forms as well unless the context clearly indicates otherwise. The term "comprise" or "comprising" used herein does not preclude the presence or addition of one or more other elements, steps, operations, and/or devices other than stated elements, steps, operations, and/or devices.

Hereinafter, exemplary embodiments of the present invention will be described in detail with reference to the accompanying drawings.

Figure 1:
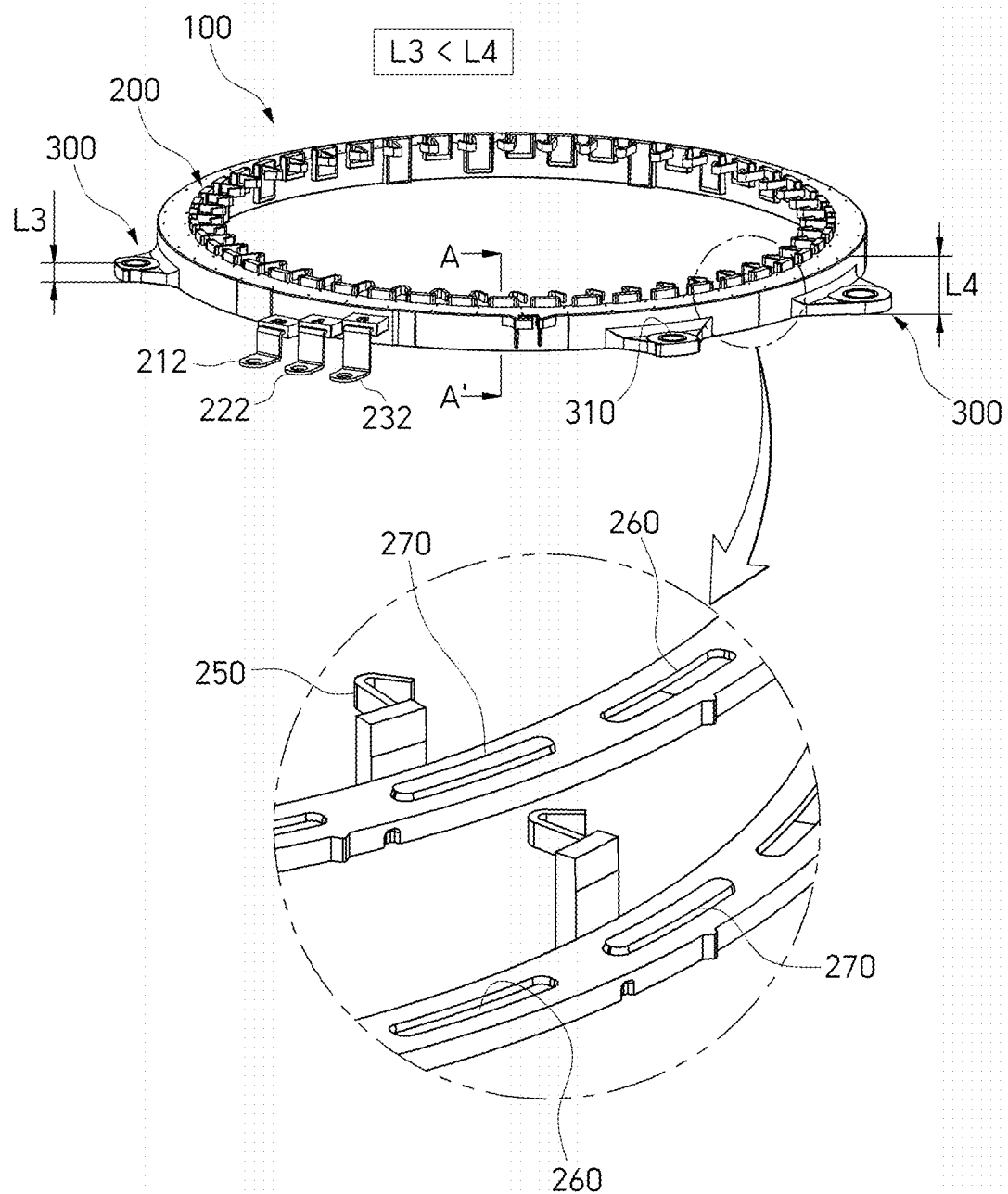
FIG. 1 schematically shows a one body type terminal assembly of a driving motor for a vehicle according to one embodiment of the present invention.
Figure 2:
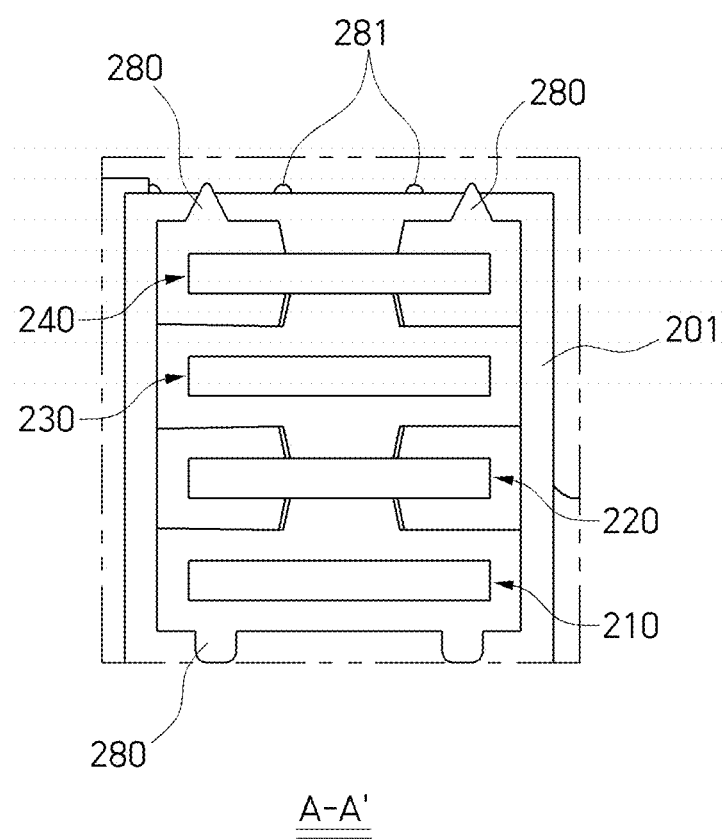
FIG. 2 shows a cross-sectional view taken along line A-A' shown in FIG. 1.

FIG. 1 schematically shows a one body type terminal assembly of a driving motor for a vehicle according to one embodiment of the present invention, FIG. 2 shows a cross-sectional view taken along line A-A' shown in FIG. 1, and FIG. 3 shows a bus bar assembly in the one body type terminal assembly of a driving motor for a vehicle according to one embodiment of the present invention.

Referring to FIGS. 1 to 3, a terminal assembly 100 of a driving motor of a vehicle includes a bus bar assembly 200 and flanges 300.

The bus bar assembly 200 has a structure in which a plurality of ring-shaped bus bars, which are primarily injection-molded by insert-injection-molding and of which outer surfaces are surrounded with an insulating material, overlap each other.

Here, it is preferable that some adjacent sections of bus bars 210, 220, 230, and 240 are concavo-convex coupled so as to overlap each other without loose parts.

For example, a plurality of coupling grooves 260 are provided in an upper end and a lower end of each of the bus bars 210, 220, 230, and 240 in a circumferential direction.

In this case, it is preferable that a coupling protrusion 270 corresponding to the coupling groove 260 is provided in each of the bus bars 210, 220, 230, and 240.

Consequently, since the bus bar assembly 200 is formed in a size in which the coupling groove 260 and the coupling protrusion 270 correspond to each other, the bus bar assembly 200 is formed in a structure in which the coupling groove 260 and the coupling protrusion 270 overlap mutually sufficiently even when precision is not particularly high so that work efficiency may be improved.

Meanwhile, a plurality of hook portions 250 connecting a coil assembly (not shown) wound around a bobbin of a drive motor (not shown) are formed to protrude from inner portions of the plurality of bus bars 210, 220, 230, and 240.

The flanges 300 are formed at intervals to protrude from an outer circumferential surface of the bus bar assembly 200. When the bus bar assembly 200 is secondarily insert-injection-molded, the flanges 300 are simultaneously insert-injection-molded with the bus bar assembly 200.

In other words, in a state in which bushings 310 are located on the outer circumferential surface of the primarily molded bus bar assembly 200, the flanges 300 are molded by injecting liquid plastic made of an insulating material at a high pressure.

That is, insert-injection-molding is performed in a state in which the flanges 300 surrounds side surfaces of the bushings 310 which pass therethrough vertically.

In this case, a vertical length L3 of the flange 300 is shorter than a vertical length L4 of the bus bar assembly 200. It is preferable that a vertical length of the bushing 310 is equal to the vertical length L3 of the flange 300.

The terminal assembly 100 is surrounded with an injection object 201 made of an insulating material.

In this case, in order to secure a predetermined thickness when the bus bar assembly 200 is secondarily insert-injection-molded, a plurality of support protrusions 280 in contact with a mold are formed on the upper end and the lower end of the bus bar assembly 200.

A thickness of the injection object 201 made of an insulating material and surrounding an outer surface of the bus bar assembly 200 corresponds to a length of the support protrusion 280.

In a prefabricated terminal structure not employing an overmolding method, a height of the flange may not be freely applied. However, according to the present invention, an overmolded structure is applied to generate only a required height so that it is possible to reduce a weight and a production cost.

FIGS. 4A to 4C and 5A to 5B schematically show a state in which the bus bar assembly is overmolded by being pressurized with a mold in the one body type terminal assembly of a driving motor for a vehicle according to one embodiment of the present invention.

Figure 3A:
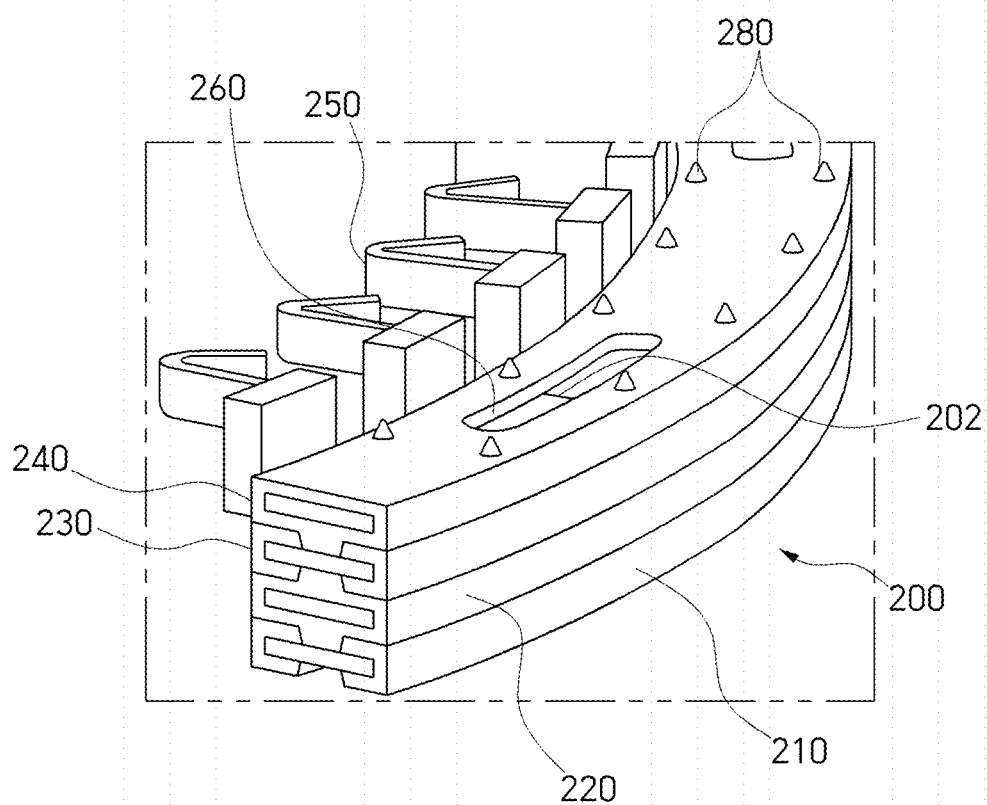
FIGS. 3A and 3B show a bus bar assembly in the one body type terminal assembly of a driving motor for a vehicle according to one embodiment of the present invention.
Figure 3B:
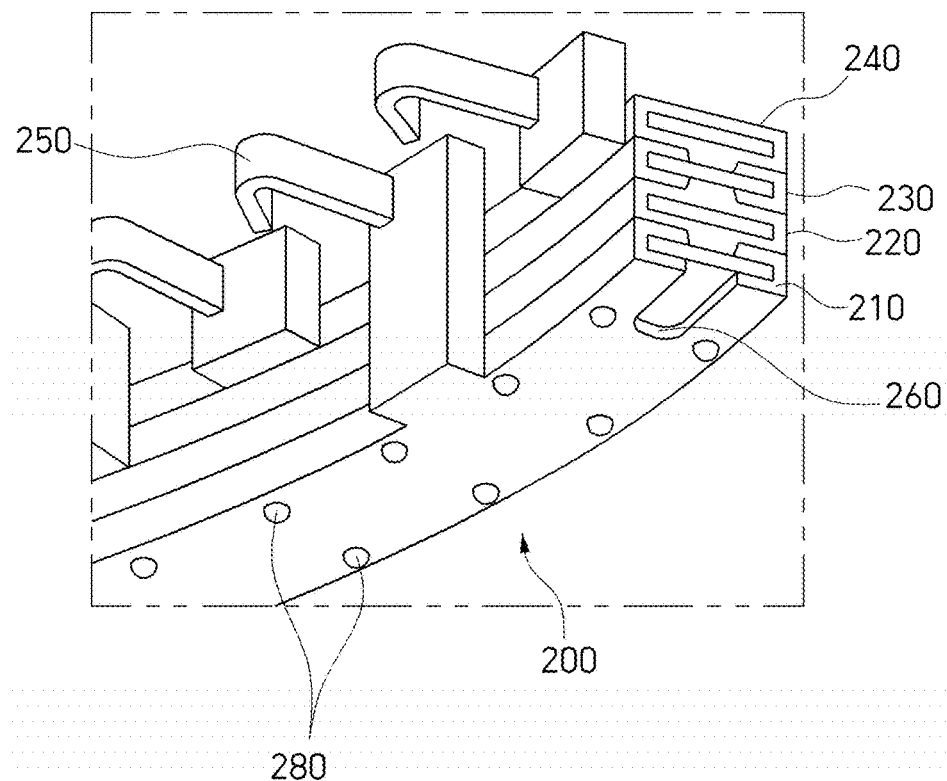
Figure 4A:
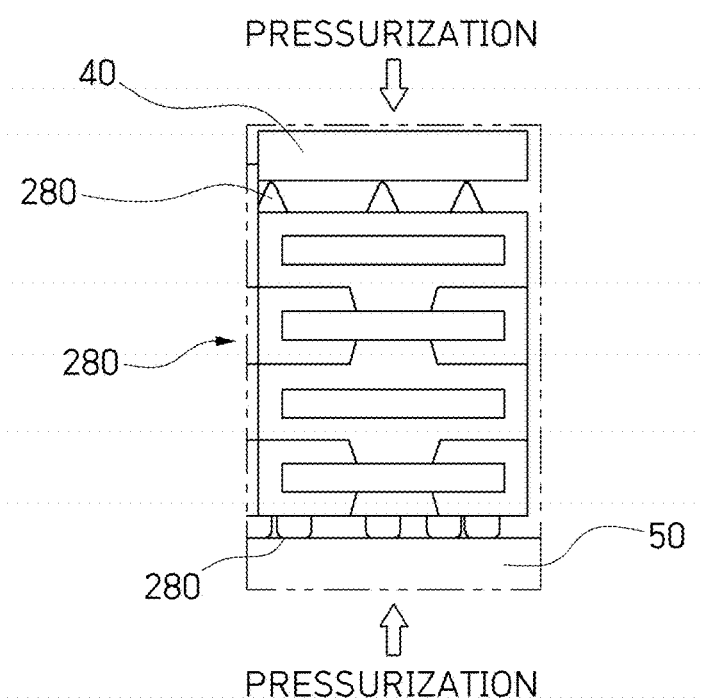
FIGS. 4A to 4C and 5A to 5B schematically show a state in which the bus bar assembly is overmolded by being pressurized with a mold in the one body type terminal assembly of a driving motor for a vehicle according to one embodiment of the present invention.
Figure 4B:
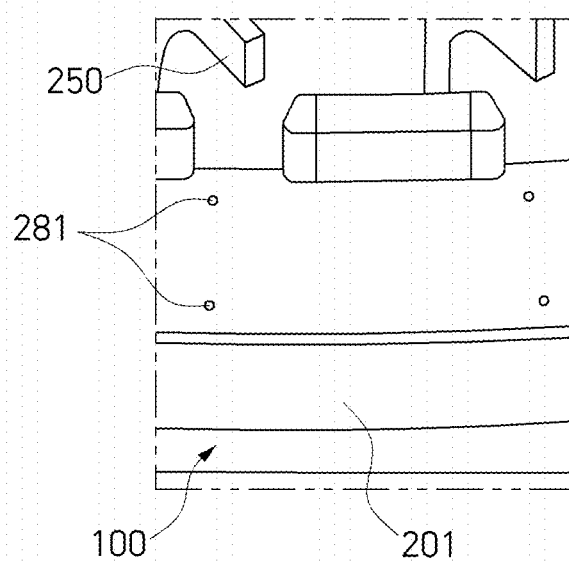
Figure 4C:
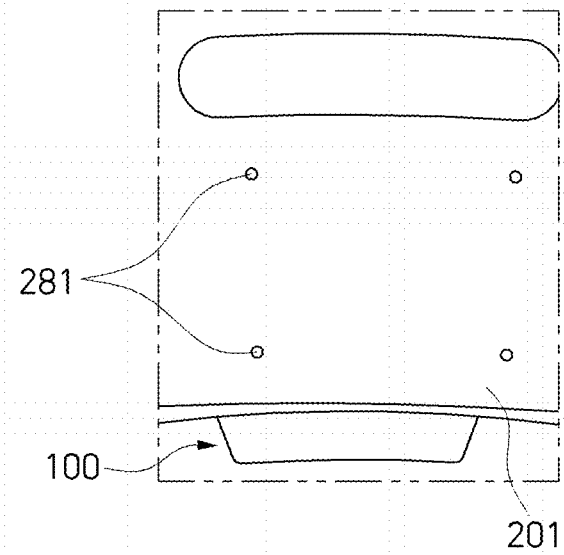
Figure 5A:
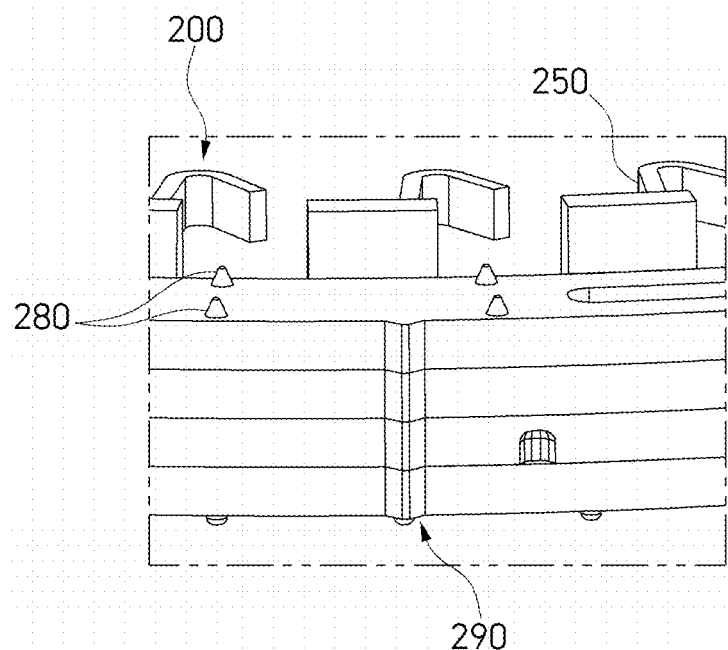
Figure 5B:
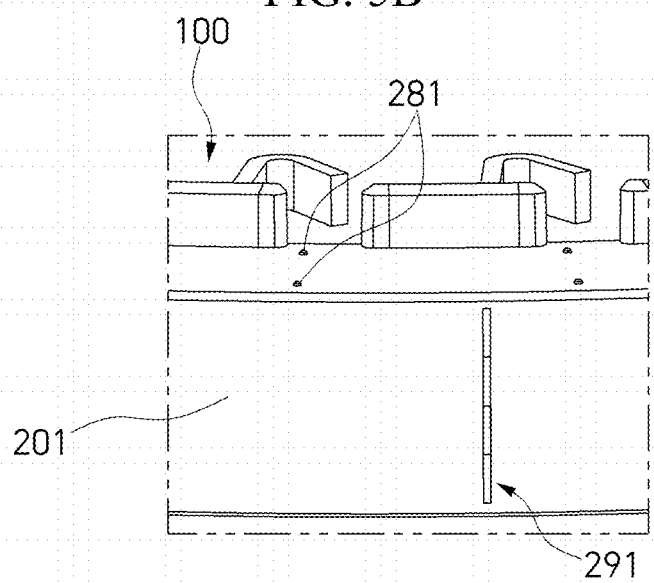

Referring to FIGS. 4A to 4C and 5A to 5B together, in order to form the terminal assembly 100 as shown in FIGS. 5A and 5B, the bus bar assembly 200 in which the plurality of bus bars 210, 220, 230, and 240 in FIGS. 3A and 3B are assembled is seated in upper and lower molds 40 and 50, which are overmolded, and then injection is performed once more.

However, after the overmolding is finally performed, in order to secure insulation performance, it is necessary to minimize exposure of the terminal assembly 100 to the outside. This is because a structure for holding the bus bar assembly 200 using the upper and lower molds 40 and 50 may not be applied.

Therefore, the support protrusions 280 provided on the upper end and the lower end of the bus bar assembly 200 are in contact with the upper and lower molds 40 and 50 to serve to fix the bus bar assembly 200 within the upper and lower molds 40 and 50.

In this case, only the side contactor 281, which is a distal end of the support protrusion 280 coming into contact with the mold, is exposed to the outside, and the side protrusion 290 is covered with an injection material.

Consequently, owing to the support protrusion 280, an empty space is formed between the bus bar assembly 200 and the molds 40 and 50, and the injection material is introduced into the empty space to form a shape.

Additionally, a plurality of side protrusions 290 are formed on the outer circumferential surface of the bus bar assembly 200, wherein the plurality of side protrusions 290 protrude from positions corresponding to the support protrusions 280 in the circumferential direction.

Like the support protrusion 280, the side protrusion 290 is located between the bus bar assembly 200 and the side mold (not shown) to be in contact with the mold. Consequently, an empty space is formed between the bus bar assembly 200 and the side mold and the injection material is introduced into the empty space to form a shape.

In this case, only a side contactor 291, which is a distal end of the side protrusion 290 coming into contact with the mold, is exposed to the outside, and the side protrusion 290 is covered with the injection material.

Figure 6:
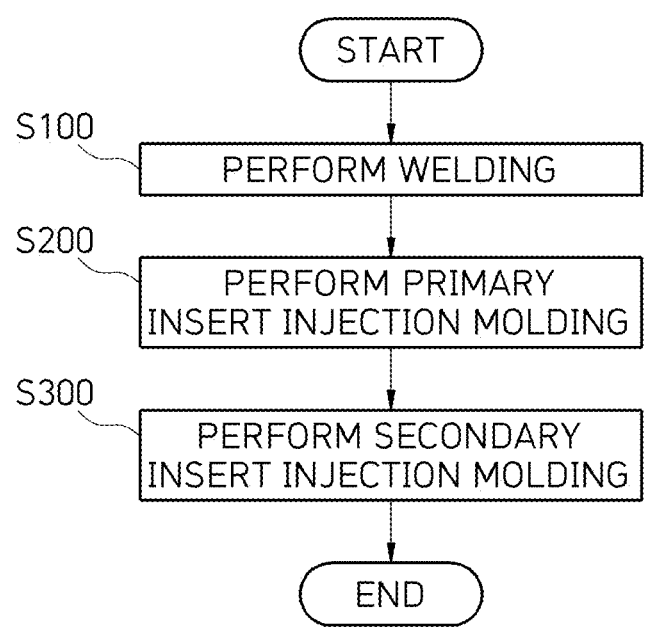
FIG. 6 shows a flowchart of a method of manufacturing a one body type terminal assembly of a driving motor for a vehicle according to one embodiment of the present invention.

FIG. 6 shows a flowchart of a method of manufacturing a one body type terminal assembly of a driving motor for a vehicle according to one embodiment of the present invention, and FIGS. 7A to 7D show a process of the method of manufacturing a one body type terminal assembly of a driving motor for a vehicle according to one embodiment of the present invention.

Referring to FIGS. 6 and 7A to 7D together, a method of manufacturing a one body type terminal assembly of a driving motor for a vehicle broadly includes welding (S100), primary insert-injection-molding (S200), and secondary insert-injection-molding (S300).

Figure 7A:
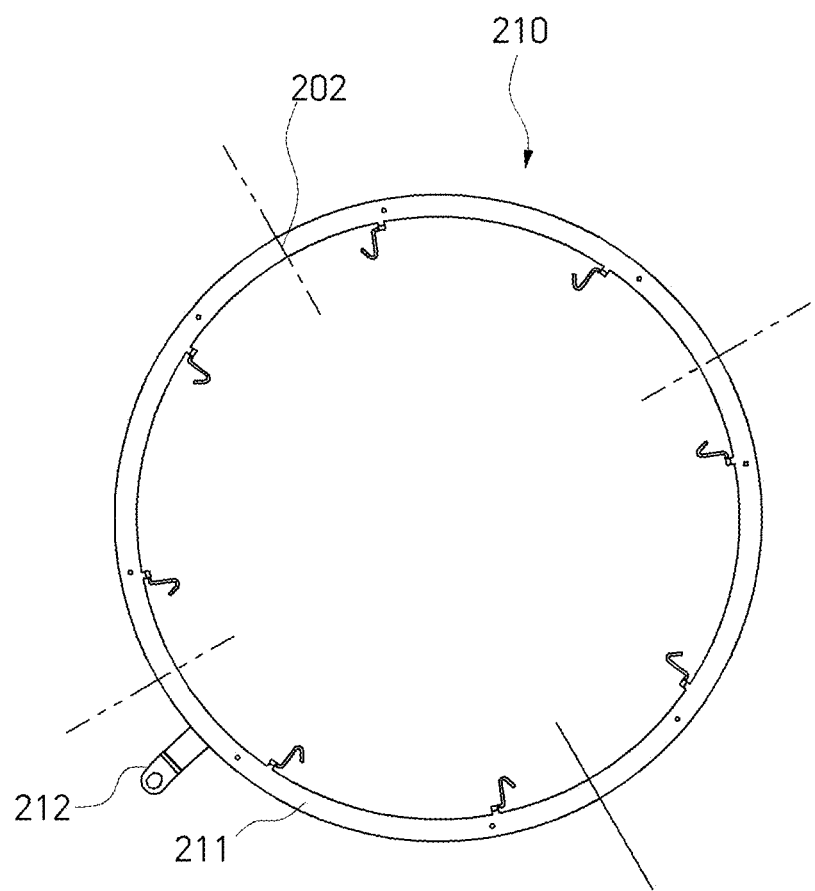
FIGS. 7A to 7D show a process of the method of manufacturing a one body type terminal assembly of a driving motor for a vehicle according to one embodiment of the present invention.

As shown in FIG. 7A, the welding (S100) is an operation of forming the ring-shaped bus bar 210 by welding a plurality of bus bar unit bodies 211 constituting an arc.

In this case, the bus bar 210 in the welding (S100) is formed such that four bus bar unit bodies 211 which are equally divided are mutually welded.

Figure 7B:
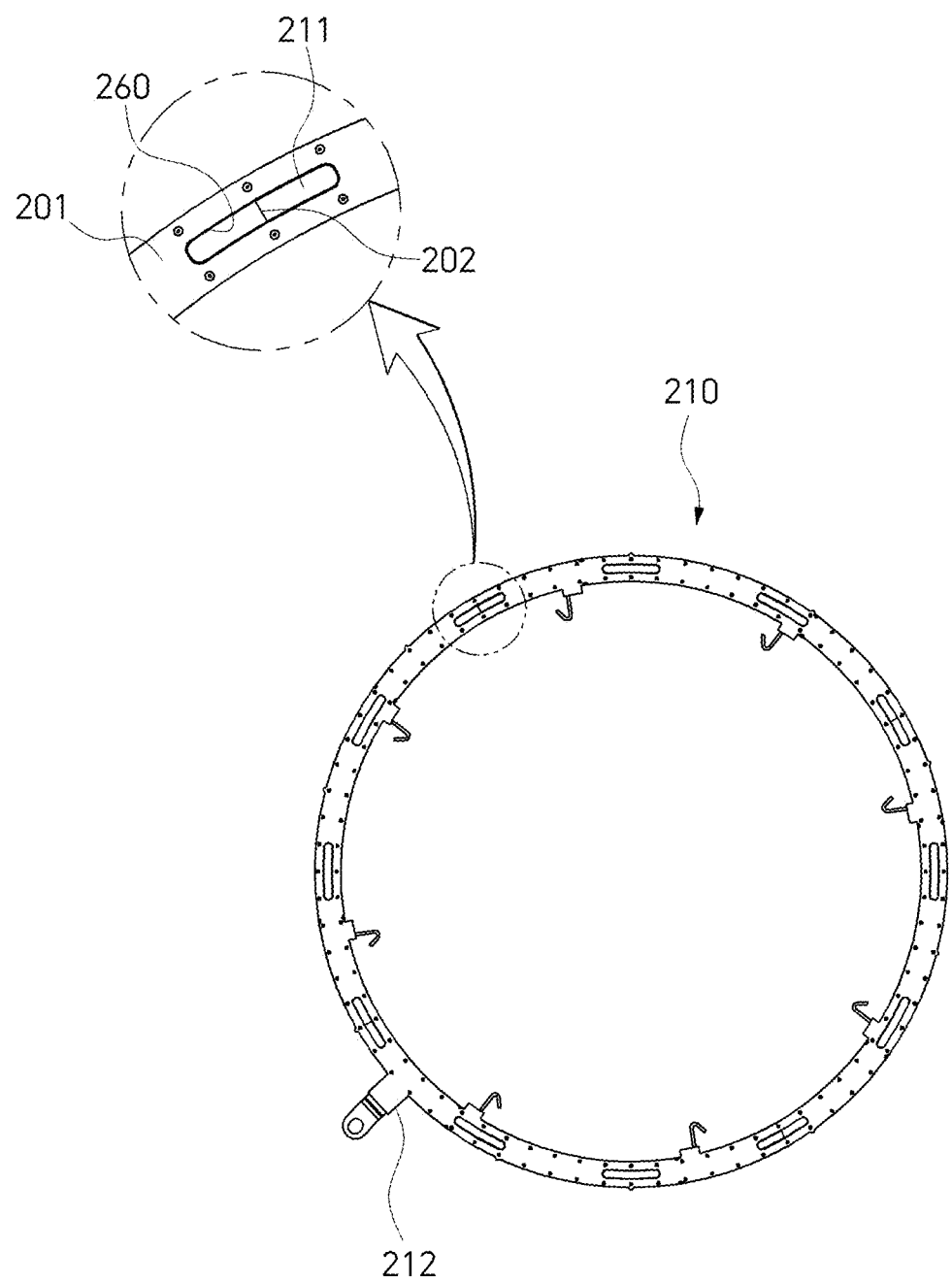

As shown in FIG. 7B, the primary insert-injection-molding (S200) is an operation of insert-injection-molding an outer surface of the bus bar 210 with an insulating material.

In this case, in the primary insert-injection-molding (S200), the plurality of coupling grooves 260 are formed in the circumferential direction at an upper end and a lower end of the bus bar 210 such that the bus bar 210 is located at a welding seam 202 of the bus bar unit body 211.

Here, it is preferable that the welding seam 202 is pressurized by being in contact with the mold so as to not be affected by an injection pressure.

Figure 7C:
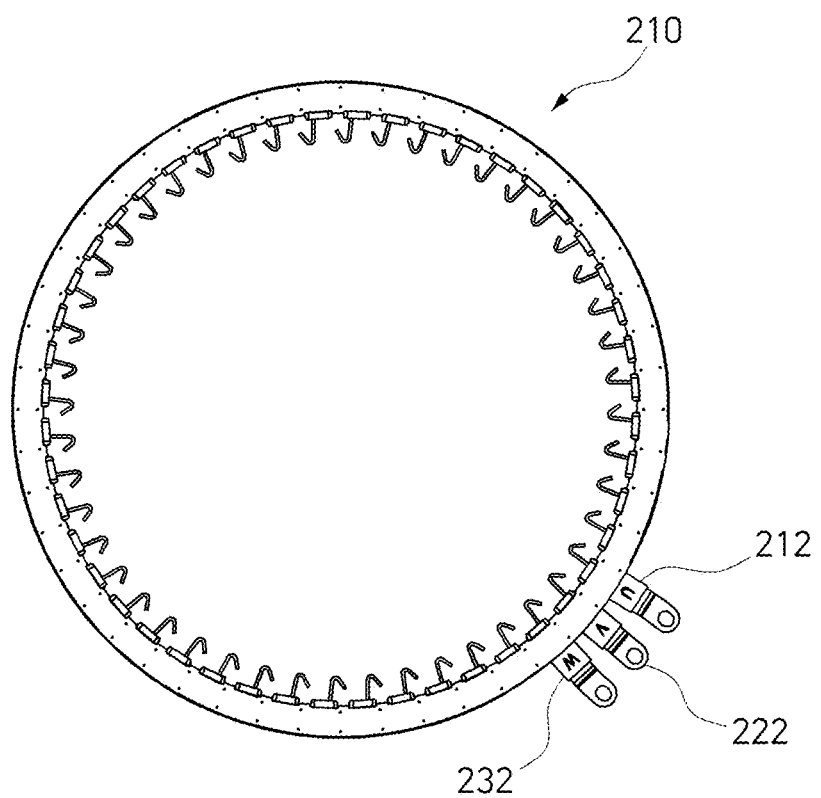
Figure 7D:
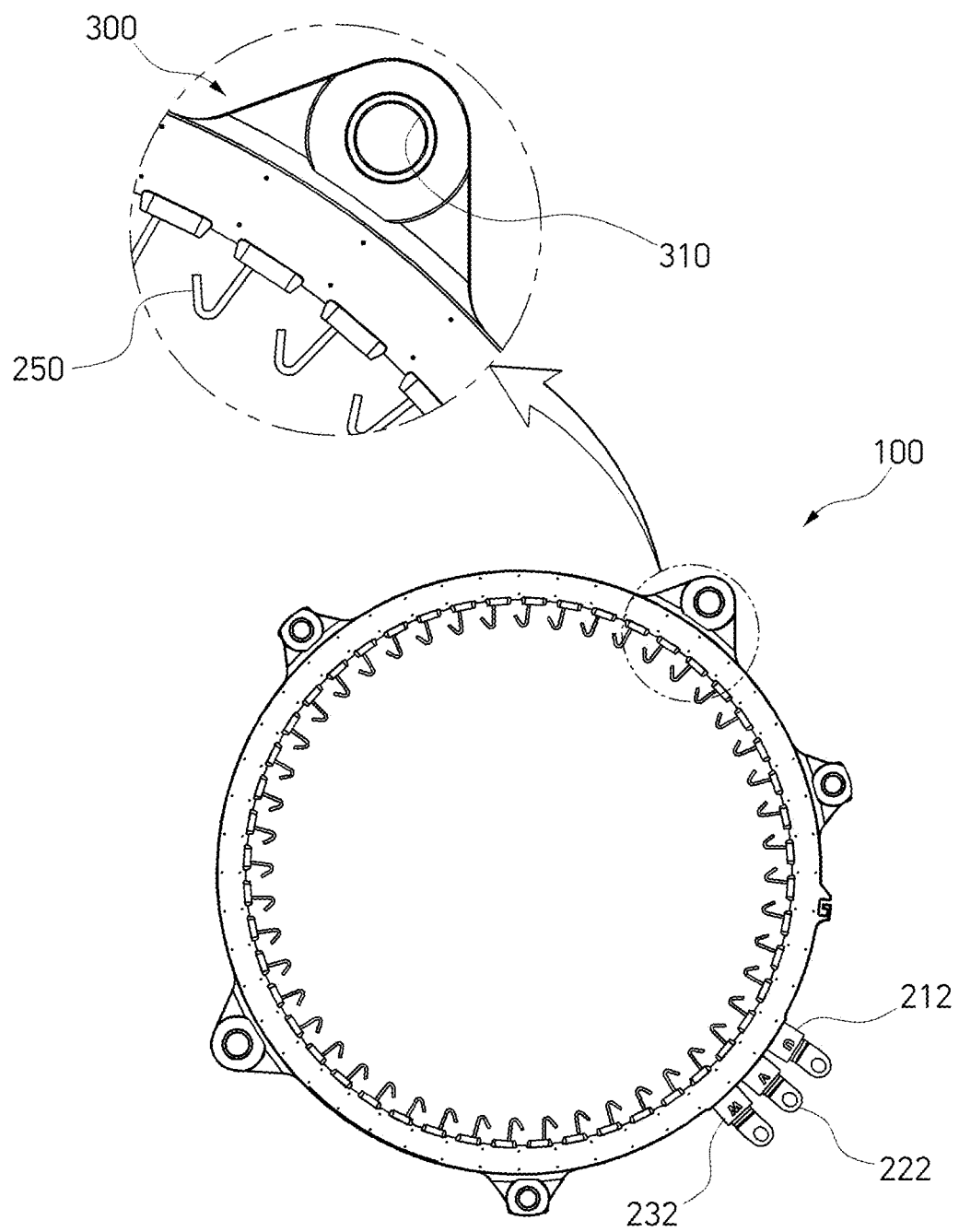

As shown in FIGS. 7C and 7D, the secondary insert-injection-molding (S300) is an operation of insert-injection-molding after setting the bus bar unit body 211, in which the plurality of bus bars 210, which are primarily insert-injection-molded, to overlap each other, and the plurality of bushings 310 to be seated on an outer circumferential surface of the bus bar unit body 211.

Here, it is preferable that the bus bar assembly 200 is overmolded and that the flange 300 surrounding the bushing 310 is formed on the outer circumferential surface of the bus bar assembly 200.

In this case, in the secondary insert injection molding, a plurality of support protrusions (not shown) in contact with a mold (not shown) are formed on the upper end and the lower end of the bus bar assembly 200 so as to secure a predetermined thickness.

It is preferable that a plurality of side protrusions are formed on the outer circumferential surface of the bus bar assembly 200, wherein the plurality of side protrusions protrude from positions corresponding to the support protrusions in the circumferential direction.

In accordance with the present invention, in order to properly apply flanges having different specifications for each vehicle model to various vehicle models, a bus bar assembly which is sharable is additionally insert-injected so that it is possible to reduce the number of processes and various expenses.

That is, during a primary insert injection, only a bus bar which is sharable can be applied, and a flange can be applied during a secondary insert injection. This can utilize the primarily insert-injected bus bar assembly to manufacture the flange according to specifications of each type of a vehicle.

Therefore, in accordance with the present invention, the bus bar assembly is additionally insert-injected to form the flange so that a terminal assembly manufactured according to a desired type of the vehicle and a manufacturing method thereof can be provided.

The present invention is not limited to the above-described embodiments, and various modifications may be made without departing from the spirit of the present invention.

What is claimed is:

1. A terminal assembly of a driving motor for a vehicle, the terminal assembly comprising:
   a bus bar assembly including a plurality of ring-shaped bus bars overlapping each other, each of which is primarily insert-injection-molded and of which an outer surface is surrounded with an insulating material; and
   flanges which are simultaneously insert-injection-molded with the bus bar assembly to be formed to protrude from an outer circumferential surface of the bus bar assembly at intervals when the bus bar assembly is secondarily insert-injection-molded.

2. The terminal assembly of claim 1, wherein each of the bus bars are formed by being primarily insert-injection-molded after a plurality of bus bar unit bodies forming an arc are mutually welded.

3. The terminal assembly of claim 2, wherein a plurality of coupling grooves are provided in an upper end and a lower end of each of the bus bars in a circumferential direction.

4. The terminal assembly of claim 3, wherein the coupling groove is located at a welding seam of the bus bar unit body.

5. The terminal assembly of claim 4, wherein, when the bus bar is primarily injection molded, the welding seam is pressurized by being in contact with a mold so as to not be affected by an injection pressure.

6. The terminal assembly of claim 3, wherein the bus bar is provided with a coupling protrusion corresponding to the coupling groove.

7. The terminal assembly of claim 1, wherein some adjacent sections of the bus bars are concavo-convex coupled so as to overlap each other without loose parts.

8. The terminal assembly of claim 1, wherein a plurality of hook portions connecting a coil assembly wound around a bobbin of a drive motor are formed to protrude from inner portions of the bus bars.

9. The terminal assembly of claim 1, wherein, in order to secure a predetermined thickness when the bus bars are secondarily insert-injection-molded, a plurality of support protrusions in contact with a mold are formed on an upper end and a lower end of the bus bar assembly.

10. The terminal assembly of claim 9, wherein a thickness of an injection product made of an insulating material, which surrounds an outer surface of the bus bar assembly, corresponds to a length of the support protrusion.

11. The terminal assembly of claim 9, wherein a plurality of side protrusions are formed to protrude from the outer circumferential surface of the bus bar assembly at positions corresponding to the support protrusions to be in contact with the mold.

12. The terminal assembly of claim 1, wherein the flange is insert-injection-molded in a state in which the flange surrounds a side surface of a bushing which passes therethrough vertically.

13. The terminal assembly of claim 12, wherein a vertical length of the flange is shorter than a vertical length of the bus bar assembly, and a vertical length of the bushing is equal to that of the flange.

14. The terminal assembly of claim 1, wherein:
   the bus bar assembly is formed in a shape in which U, V, W, and neural point (N) phase bus bars surrounded with an insulating material overlap each other; and
   the flange is integrally formed with the bus bar assembly.

15. A method of manufacturing a terminal assembly of a driving motor for a vehicle, the method comprising:
   a welding operation of welding a plurality of bus bar unit bodies forming an arc to form a ring-shaped bus bar;
   a primary insert-injection-molding operation of insert-injection-molding an outer surface of the bus bar with an insulating material; and
   a secondary insert-injection-molding operation of performing insert-injection-molding after setting the bus bar assembly, in which a plurality of the bus bars, which are primarily insert-injection-molded, to overlap each other, and a plurality of bushings to be seated on an outer circumferential surface of the bus bar assembly.

16. The method of claim 15, wherein, in the welding operation, the bus bar is formed by welding four bus bar unit bodies which are equally divided.

17. The method of claim 15, wherein, in the primary insert-injection-molding operation, a plurality of coupling grooves are formed in an upper end and a lower end of the bus bar in a circumferential direction so as to locate the bus bar at a welding seam of the bus bar unit body.

18. The method of claim 17, wherein, in the primary insert-injection-molding operation, the welding seam is pressurized by being in contact with a mold so as to not be affected by an injection pressure.

19. The method of claim 15, wherein, in the secondary insert-injection-molding operation, the bus bar assembly is overmolded, and a flange surrounding the bushing is formed on the outer circumferential surface of the bus bar assembly.

20. The method of claim 15, wherein:
   in the secondary insert-injection-molding operation, in order to secure a predetermined thickness, a plurality of support protrusions in contact with a mold are formed on an upper end and a lower end of the bus bar assembly; and
   a plurality of side protrusions are formed to protrude from the outer circumferential surface of the bus bar assembly at positions corresponding to the support protrusions to be in contact with the mold.

* * * * *